United States Patent
Cho

(10) Patent No.: US 8,296,483 B2
(45) Date of Patent: Oct. 23, 2012

(54) STORAGE DEVICE OF SERIAL ATTACHED SMALL COMPUTER SYSTEM INTERFACE/SERIAL ADVANCED TECHNOLOGY ATTACHMENT TYPE

(75) Inventor: Byungcheol Cho, Seochogu (KR)

(73) Assignee: Taejin Info Tech Co., Ltd., Seoul (KR)

( * ) Notice: Subject to any disclaimer, the term of this patent is extended or adjusted under 35 U.S.C. 154(b) by 0 days.

(21) Appl. No.: 13/120,285

(22) PCT Filed: Nov. 29, 2009

(86) PCT No.: PCT/KR2009/006904
§ 371 (c)(1),
(2), (4) Date: Mar. 22, 2011

(87) PCT Pub. No.: WO2010/059007
PCT Pub. Date: May 27, 2010

(65) Prior Publication Data
US 2011/0179198 A1      Jul. 21, 2011

(30) Foreign Application Priority Data

Nov. 24, 2008   (KR) .................. 10-2008-0117040

(51) Int. Cl.
*G06F 13/12* (2006.01)
*G06F 3/00* (2006.01)
(52) U.S. Cl. ......... 710/62; 710/2; 710/5; 710/8; 710/14; 710/33; 710/58
(58) Field of Classification Search .................. None
See application file for complete search history.

(56) References Cited

U.S. PATENT DOCUMENTS

2008/0040564 A1* 2/2008 Kubo et al. .................. 711/154
2008/0098106 A1* 4/2008 Mimatsu ...................... 709/223

OTHER PUBLICATIONS

Assessing and Comparing Serial Attached SCSI and SATA Hard Drives and SAS interface, Oct. 2003, Hewlett-Packard, [online, accessed on Dec. 16, 2011], URL: ftp://ftp.compaq.com/pub/products/servers/proliantstorage/drives-enclosures/sata-vs-sas.pdf.*

* cited by examiner

*Primary Examiner* — Scott Sun
(74) *Attorney, Agent, or Firm* — Saliwanchik, Lloyd & Eisenschenk

(57) ABSTRACT

Provided is a storage device of a serial attached small computer system interface/serial advanced technology attachment (SAS/SATA) type, which provides data storage/reading services through an SAS/SATA interface. The SAS/SATA type storage device includes: a memory disk unit which includes a plurality of memory disks provided with a plurality of volatile semiconductor memories; an SAS/SATA host interface unit which interfaces between the memory disk unit and a host; and a controller unit which adjusts synchronization of a data signal transmitted/received between the SAS/SATA host interface unit and the memory disk unit to control a data transmission/reception speed between the SAS/SATA host interface unit and the memory disk unit. The storage device can support a low-speed data processing speed for the host and simultaneously support a high-speed data processing speed for the memory disk unit, so that there are advantages in that the performance of the memory disk can be fully utilized to enable high-speed data processing in an existing interface environment.

3 Claims, 1 Drawing Sheet

[Fig. 1]
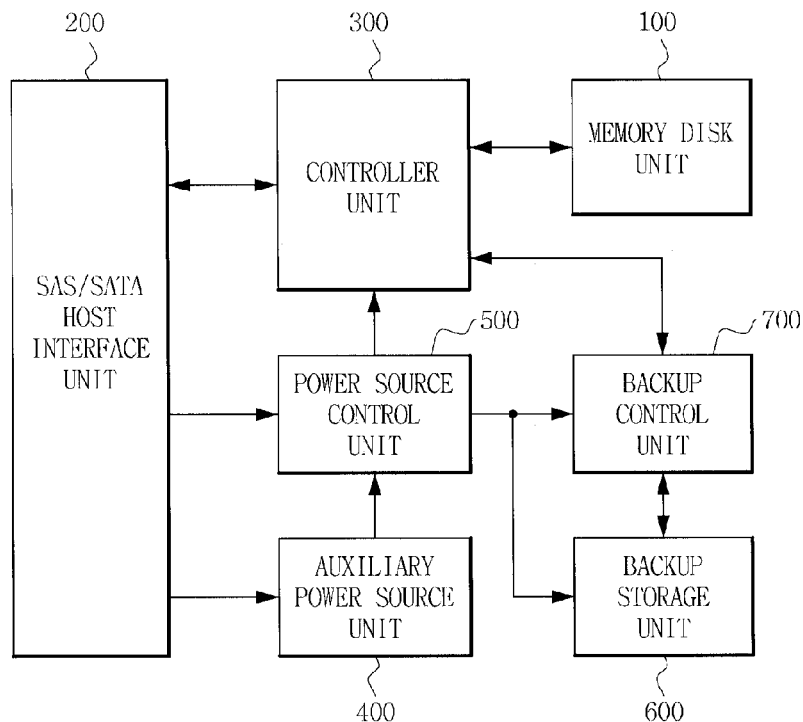
[Fig. 2]
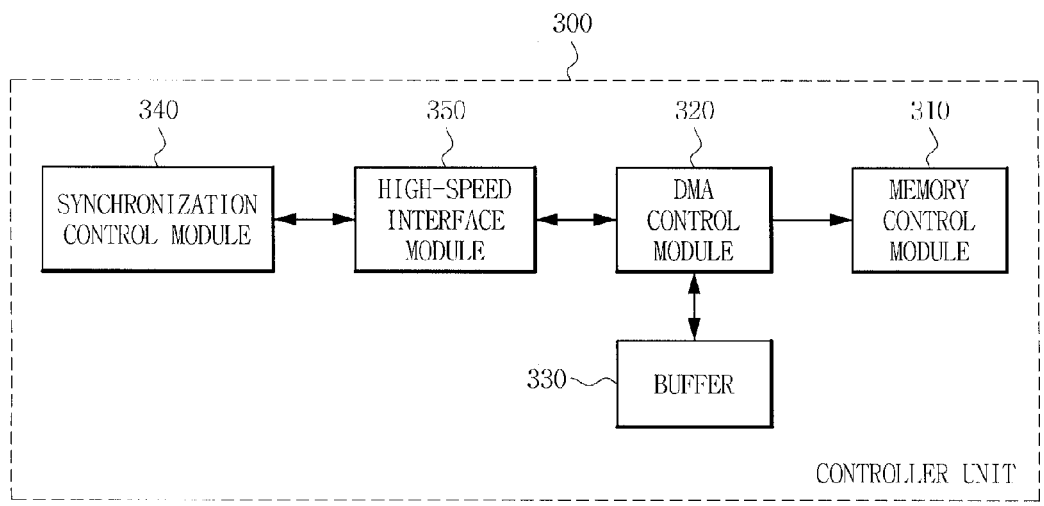

STORAGE DEVICE OF SERIAL ATTACHED SMALL COMPUTER SYSTEM INTERFACE/SERIAL ADVANCED TECHNOLOGY ATTACHMENT TYPE

CROSS-REFERENCE TO RELATED APPLICATION

The current application claims the benefit of co-pending PCT Patent Application No. PCT/KR2009/006904 filed Nov. 24, 2009, which is hereby incorporated herein by reference.

TECHNICAL FIELD

This disclosure relates to a storage device of a serial attached small computer system interface/serial advanced technology attachment (SAS/SATA) type, and more particularly, to a storage device of an SAS/SATA type for providing data storage/reading services through an SAS/SATA interface.

BACKGROUND ART

In general, a storage device includes a hard disk as a data storage medium, and a serial attached small computer system interface/serial advanced technology attachment (SAS/SATA) interface for interfacing the data storage medium and a host with each other. Here, the host is a computer system, or the like using the storage device as a storage space.

Since the storage device uses a hard disk which stores/reads data in a mechanical manner as a data storage medium, there is a problem in that a data processing speed is slow.

In order to solve the problem, recently, a storage device which includes one or more memory disks provided with a plurality of semiconductor memories for high-speed data input/output so as to be used as a data storage medium instead of the hard disk has been released.

However, the existing storage device still uses the SAS/SATA interface, which cannot catch up with the data processing speed of the memory disk having high-speed data input/output performance, as an interface between the data storage medium and the host. Therefore, there is a problem in that the performance of the memory disk cannot be properly utilized.

SUMMARY OF THE INVENTION

This disclosure provides a storage device of a serial attached small computer system interface/serial advanced technology attachment (SAS/SATA) type which supports a low-speed data processing speed for a host by adjusting synchronization of a data signal transmitted/received between the host and a memory disk during data communications between the host and the memory disk through an SAS/SATA interface, while simultaneously supporting a high-speed data processing speed for the memory disk, and thereby supporting the performance of the memory to enable high-speed data processing in an existing interface environment at the maximum.

In a first approach, the invention provides a storage device of a serial attached small computer system interface/serial advanced technology attachment (SAS/SATA) type, comprising: a memory disk unit, which includes a plurality of memory disks provided with a plurality of volatile semiconductor memories; an SAS/SATA host interface unit, which interfaces between the memory disk unit and a host; and a controller unit, which adjusts synchronization of a data signal transmitted/received between the SAS/SATA host interface unit and the memory disk unit to control a data transmission/reception speed between the SAS/SATA host interface unit and the memory disk unit, wherein the controller unit includes: a memory control module, which controls data input/output of the memory disk unit; a DMA control module, which controls the memory control module to store data in the memory disk unit or reads data from the memory disk unit to provide the data to the host, according to an instruction from the host received through the SAS/SATA host interface unit; a buffer, which buffers data according to control of the DMA control module; a synchronization control module, which, when receiving a data signal corresponding to the data read from the memory disk unit by the control of the DMA control module through the DMA control module and the memory control module, adjusts synchronization of a data signal so as to have a communication speed corresponding to an SAS/SATA communications protocol to transmit the synchronized data signal to the SAS/SATA host interface unit, and when receiving a data signal from the host through the SAS/SATA host interface unit, adjusts synchronization of the data signal so as to have a transmission speed corresponding to a communications protocol used by the memory disk unit to transmit the synchronized data signal to the memory disk unit through the DMA control module and the memory control module; and a high-speed interface module, which processes the data transmitted/received between the synchronization control module and the DMA control module at high speed, includes a buffer having a double buffer structure and a buffer having a circular queue structure, and processes the data transmitted/received between the synchronization control module and the DMA control module without loss at high speed by buffering the data transmitted/received between the synchronization control module and the DMA control module using the buffers and adjusting data clocks.

BRIEF DESCRIPTION OF THE DRAWINGS

FIG. 1 is a diagram schematically illustrating a configuration of a storage device of a serial attached small computer system interface/serial advanced technology attachment (SAS/SATA) type according to an embodiment; and FIG. 2 is a diagram schematically illustrating a configuration of a controller unit in FIG. 1.

DETAILED DESCRIPTION OF THE INVENTION

This disclosure provides a storage device of a serial attached small computer system interface/serial advanced technology attachment (SAS/SATA) type which supports a low-speed data processing speed for a host by adjusting synchronization of a data signal transmitted/received between the host and a memory disk during data communications between the host and the memory disk through an SAS/SATA interface, and simultaneously supports a high-speed data processing speed for the memory disk, thereby supporting the performance of the memory to enable high-speed data processing in an existing interface environment at the maximum.

In one aspect, there is provided a storage device of a serial attached small computer system interface/serial advanced technology attachment (SAS/SATA) type, including: a memory disk unit which includes a plurality of memory disks provided with a plurality of volatile semiconductor memories; an SAS/SATA host interface unit which interfaces between the memory disk unit and a host; and a controller unit which adjusts synchronization of a data signal transmitted/received between the SAS/SATA host interface unit and the memory disk unit to control a data transmission/reception speed between the SAS/SATA host interface unit and the memory disk unit.

The control unit may include: a memory control module which controls data input/output of the memory disk unit; a DMA control module which controls the memory control module to store data in the memory disk unit or reads data from the memory disk unit to provide the data to the host, according to an instruction from the host received through the SAS/SATA host interface unit; a buffer which buffers data according to control of the DMA control module; a synchronization control module which, when receiving a data signal corresponding to the data read from the memory disk unit by the control of the DMA control module through the DMA control module and the memory control module, adjusts synchronization of a data signal so as to have a communication speed corresponding to an SAS/SATA communications protocol to transmit the synchronized data signal to the SAS/SATA host interface unit, and when receiving a data signal from the host through the SAS/SATA host interface unit, adjusts synchronization of the data signal so as to have a transmission speed corresponding to a communications protocol used by the memory disk unit to transmit the synchronized data signal to the memory disk unit through the DMA control module and the memory control module; and a high-speed interface module which processes the data transmitted/received between the synchronization control module and the DMA control module at high speed.

The storage device of an SAS/SATA type may further include: a backup storage unit which stores data of the memory disk unit; and a backup control unit which backs up data stored in the memory disk unit in the backup storage unit, according to an instruction from the host or when an error occurs in the power transmitted from the host.

The storage device of an SAS/SATA type may further include: an auxiliary power source unit which is charged to maintain a predetermined power using the power transferred from the host through the SAS/SATA host interface unit; and a power source control unit which supplies the power transferred from the host through the SAS/SATA host interface unit to the controller unit, the memory disk unit, the backup storage unit, and the backup control unit, and when the power transferred from the host through the SAS/SATA host interface unit is blocked or an error occurs in the power transferred from the host, receives power from the auxiliary power source unit and supplies the power to the memory disk unit through the controller unit.

The storage device of a serial attached small computer system interface/serial advanced technology attachment (SAS/SATA) type supports a low-speed data processing speed for a host by adjusting synchronization of a data signal transmitted/received between the host and a memory disk during data communications between the host and the memory disk through an SAS/SATA interface, and simultaneously supports a high-speed data processing speed for the memory disk, thereby supporting the performance of the memory to enable high-speed data processing in an existing interface environment at the maximum.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. do not denote a limitation of quantity, but rather denote the presence of at least one of the referenced item. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

Hereinafter, a storage device of a serial attached small computer system interface/serial advanced technology attachment (SAS/SATA) type according to an embodiment will be described in detail with reference to the accompanying drawings.

Referring to FIG. 1, an SAS/SATA type storage device according to an embodiment includes a memory disk unit 100, an SAS/SATA host interface unit 200, a controller unit 300, an auxiliary power source unit 400, a power source control unit 500, a backup storage unit 600, and a backup control unit 700.

The memory disk unit 100 includes a plurality of memory disks provided with a plurality of volatile semiconductor memories for high-speed data input/output (for example, DDR, DDR2, DDR3, SDRAM, and the like), and inputs and outputs data according to the control of the controller 300. The memory disk unit 100 may have a configuration in which the memory disks are arrayed in parallel.

The SAS/SATA host interface unit 200 interfaces between a host and the memory disk unit 100. The host may be a computer system or the like, which is provided with an SAS/SATA interface and a power source supply device.

The controller unit 300 adjusts synchronization of data signals transmitted/received between the SAS/SATA host interface unit 200 and the memory disk unit 100 to control a data transmission/reception speed between the SAS/SATA host interface unit 200 and the memory disk unit 100.

FIG. 2 is a diagram schematically illustrating a configuration of the controller unit provided in the SAS/SATA type storage device according to the embodiment. Referring to FIG. 2, the controller unit 300 according to the embodiment includes: a memory control module 310 which controls data input/output of the memory disk unit 100; a DMA (Direct Memory Access) control module 320 which controls the memory control module 310 to store the data in the memory disk unit 100, or reads data from the memory disk unit 100 to provide the data to the host, according to an instruction from the host received through the SAS/SATA host interface unit 200; a buffer 330 which buffers data according to the control of the DMA control module 320; a synchronization control module 340 which, when receiving a data signal corresponding to the data read from the memory disk unit 100 by the control of the DMA control module 320 through the DMA control module 320 and the memory control module 310, adjusts synchronization of a data signal so as to have a communication speed corresponding to an SAS/SATA communications protocol to transmit the synchronized data signal to the SAS/SATA host interface unit 200, and when receiving a data signal from the host through the SAS/SATA host interface unit 200, adjusts synchronization of the data signal so as to have a transmission speed corresponding to a communications protocol (for example, PCI, PCI-x, or PCI-e, and the like) used by the memory disk unit 100 to transmit the synchronized data signal to the memory disk unit 100 through the DMA control module 320 and the memory control module 310; and a high-speed interface module 350 which processes the data transmitted/received between the synchronization control module 340 and the DMA control module 320 at high speed. Here, the high-speed interface module 350 includes a buffer having a double buffer structure and a buffer having a circular queue structure, and processes the data transmitted/received between the synchronization control module 340 and the DMA control module 320 without loss at high speed by buffering the data transmitted/received between the synchronization control module 340 and the DMA control module 320 using the buffers and adjusting data clocks.

The auxiliary power source unit 400 may be configured as a rechargeable battery or the like, so that it is normally charged to maintain a predetermined power using power transferred from the host through the SAS/SATA host interface unit 200, and supplies the charged power to the power source control unit 500 according to the control of the power source control unit 500.

The power source control unit 500 supplies the power transferred from the host through the SAS/SATA host interface unit 200 to the controller unit 300, the memory disk unit 100, the backup storage unit 600, and the backup control unit 700.

In addition, when an error occurs in a power source of the host because the power transmitted from the host through the SAS/SATA host interface unit 200 is blocked or the power transmitted from the host deviates from a threshold value, the power source control unit 500 receives power from the auxiliary power source unit 400 and supplies the power to the memory disk unit 100 through the controller unit 300.

The backup storage unit 600 is configured as a low-speed non-volatile storage device such as a hard disk, and stores data of the memory disk unit 100.

The backup control unit 700 backs up data stored in the memory disk unit 100 in the backup storage unit 600 by controlling the data input/output of the backup storage unit 600, and backs up the data stored in the memory disk unit 100 in the backup storage unit 600, according to an instruction from the host or when an error occurs in the power source of the host due to a deviation of the power transmitted from the host deviates from the threshold value.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

As described herein, the storage device of a serial attached small computer system interface/serial advanced technology attachment (SAS/SATA) type supports a low-speed data processing speed for a host by adjusting synchronization of a data signal transmitted/received between the host and a memory disk during data communications between the host and the memory disk through an SAS/SATA interface, and simultaneously supports a high-speed data processing speed for the memory disk, thereby supporting the performance of the memory to enable high-speed data processing in an existing interface environment at the maximum.

What is claimed is:

1. A storage device of a serial attached small computer system interface/serial advanced technology attachment (SAS/SATA) type, comprising:
   a memory disk unit, which includes a plurality of memory disks provided with a plurality of volatile semiconductor memories;
   an SAS/SATA host interface unit, which interfaces between the memory disk unit and a host; and
   a controller unit, which adjusts synchronization of a data signal transmitted/received between the SAS/SATA host interface unit and the memory disk unit to control a data transmission/reception speed between the SAS/SATA host interface unit and the memory disk unit, wherein the controller unit includes:
   a memory control module, which controls data input/output of the memory disk unit;
   a DMA control module, which controls the memory control module to store data in the memory disk unit or reads data from the memory disk unit to provide the data to the host, according to an instruction from the host received through the SAS/SATA host interface unit;
   a buffer, which buffers data according to control of the DMA control module;
   a synchronization control module, which, when receiving a data signal corresponding to the data read from the memory disk unit by the control of the DMA control module through the DMA control module and the memory control module, adjusts synchronization of a data signal so as to have a communication speed corresponding to an SAS/SATA communications protocol to transmit the synchronized data signal to the SAS/SATA host interface unit, and when receiving a data signal from the host through the SAS/SATA host interface unit, adjusts synchronization of the data signal so as to have a transmission speed corresponding to a communications protocol used by the memory disk unit to transmit the synchronized data signal to the memory disk unit through the DMA control module and the memory control module; and
   a high-speed interface module, which processes the data transmitted/received between the synchronization control module and the DMA control module at high speed, includes a buffer having a double buffer structure and a buffer having a circular queue structure, and processes the data transmitted/received between the synchronization control module and the DMA control module without loss at high speed by buffering the data transmitted/received between the synchronization control module and the DMA control module using the buffers and adjusting data clocks.

2. The storage device according to claim 1, further comprising:
   a backup storage unit, which stores data of the memory disk unit; and
   a backup control unit, which backs up data stored in the memory disk unit in the backup storage unit, according to an instruction from the host or when an error occurs in the power transmitted from the host.

3. The storage device according to claim 2, further comprising:
   an auxiliary power source unit, which is charged to maintain a predetermined power using the power transferred from the host through the SAS/SATA host interface unit; and
   a power source control unit, which supplies the power transferred from the host through the SAS/SATA host interface unit to the controller unit, the memory disk unit, the backup storage unit, and the backup control unit, and when the power transferred from the host through the SAS/SATA host interface unit is blocked or an error occurs in the power transferred from the host, receives power from the auxiliary power source unit and supplies the power to the memory disk unit through the controller unit.

* * * * *

UNITED STATES PATENT AND TRADEMARK OFFICE
CERTIFICATE OF CORRECTION

PATENT NO.         : 8,296,483 B2
APPLICATION NO.    : 13/120285
DATED              : October 23, 2012
INVENTOR(S)        : Byungcheol Cho Page 1 of 1

It is certified that error appears in the above-identified patent and that said Letters Patent is hereby corrected as shown below:

On the Title Page

Item (22)

"PCT Filed: Nov. 29, 2009" should read --PCT Filed: Nov. 24, 2009--.

Signed and Sealed this
Twenty-first Day of April, 2015

Michelle K. Lee
*Director of the United States Patent and Trademark Office*